United States Patent
Sekine et al.

(10) Patent No.: US 10,934,427 B2
(45) Date of Patent: Mar. 2, 2021

(54) RUBBER COMPOSITION AND PNEUMATIC TIRE USING SAME

(71) Applicant: The Yokohama Rubber Co., LTD., Tokyo (JP)

(72) Inventors: Yuko Sekine, Hiratsuka (JP); Makoto Ashiura, Hiratsuka (JP); Fumito Yatsuyanagi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 171 days.

(21) Appl. No.: 16/067,088

(22) PCT Filed: Apr. 28, 2017

(86) PCT No.: PCT/JP2017/017051
§ 371 (c)(1),
(2) Date: Jun. 28, 2018

(87) PCT Pub. No.: WO2017/195675
PCT Pub. Date: Nov. 16, 2017

(65) Prior Publication Data
US 2020/0277486 A1 Sep. 3, 2020

(30) Foreign Application Priority Data
May 10, 2016 (JP) .............................. JP2016-094648

(51) Int. Cl.
*C08L 53/02* (2006.01)
*C08L 9/06* (2006.01)
(Continued)

(52) U.S. Cl.
CPC .......... *C08L 53/025* (2013.01); *B60C 1/0016* (2013.01); *C08L 9/06* (2013.01); *C08K 3/04* (2013.01); *C08K 3/36* (2013.01)

(58) Field of Classification Search
None
See application file for complete search history.

(56) References Cited

U.S. PATENT DOCUMENTS 6,271,313 B1 * 8/2001 Zambelli .................. C08F 8/04
525/242
6,362,272 B1 3/2002 Tadaki et al.
(Continued)

FOREIGN PATENT DOCUMENTS

EP 3 269 769 1/2018
EP 3 269 770 1/2018
(Continued)

OTHER PUBLICATIONS

International Search Report for International Application No. PCT/JP2017/017051 dated Aug. 1, 2017, 4 pages, Japan.

*Primary Examiner* — Tae H Yoon
(74) *Attorney, Agent, or Firm* — Thorpe North & Western

(57) ABSTRACT

A rubber composition contains a diene rubber component and a reinforcing filler, the diene rubber component containing a styrene-butadiene copolymer component including at least one type of styrene-butadiene copolymer and satisfying: the bonded styrene content is from 5 to 50 wt. %; of components obtained by ozone decomposition, a content of a decomposed component V1 containing one 1,2-bonded butadiene-derived unit out of a total of 100 mol % of decomposed components containing styrene-derived unit(s) and/or the 1,2-bonded butadiene-derived unit(s) is not less than 25 mol %; of the components obtained by ozone decomposition, a content of a decomposed component S2V1 containing two of the styrene-derived units and one of the 1,2-bonded butadiene-derived unit out of a total of 100 mol % of the decomposed components containing the styrene-derived unit(s) and/or the 1,2-bonded butadiene-derived unit(s) is not less than 5 mol %; and a vinyl content of a butadiene moiety is not less than 50%.

8 Claims, 3 Drawing Sheets

(51) Int. Cl.
    *C08K 3/04*    (2006.01)
    *C08K 3/36*    (2006.01)
    *B60C 1/00*    (2006.01)

(56) References Cited

U.S. PATENT DOCUMENTS

| | | | |
|---|---|---|---|
| 8,440,757 B2 * | 5/2013 | Kushida | B60C 1/0016 524/492 |
| 2003/0100660 A1 | 5/2003 | Zanzig et al. | |
| 2017/0204257 A1 * | 7/2017 | Labrunie | C08K 3/36 |
| 2018/0065413 A1 | 3/2018 | Sekine et al. | |
| 2018/0072100 A1 | 3/2018 | Sekine et al. | |
| 2018/0179364 A1 | 6/2018 | Sekine et al. | |
| 2018/0186975 A1 | 7/2018 | Sekine et al. | |
| 2018/0298164 A1 | 10/2018 | Sekine et al. | |
| 2018/0298165 A1 | 10/2018 | Sekine et al. | |
| 2018/0298166 A1 | 10/2018 | Sekine et al. | |
| 2019/0002670 A1 | 1/2019 | Sekine et al. | |
| 2019/0091605 A1 | 3/2019 | Yamaki et al. | |

FOREIGN PATENT DOCUMENTS

| | | |
|---|---|---|
| EP | 3 309 201 | 4/2018 |
| EP | 3 309 202 | 4/2018 |
| EP | 3 309 203 | 4/2018 |
| EP | 3 309 204 | 4/2018 |
| EP | 3 309 205 | 4/2018 |
| EP | 3 309 206 | 4/2018 |
| EP | 3 431 983 | 1/2019 |
| JP | S57-179212 | 11/1982 |
| JP | H03-239737 | 10/1991 |
| JP | H07-300511 | 11/1995 |
| JP | 2000-038423 | 2/2000 |
| JP | 2000-178378 | 6/2000 |
| JP | 2010-280853 | 12/2010 |
| WO | WO 2015/185395 | * 12/2015 |
| WO | WO 2016-147961 | 9/2016 |
| WO | WO 2016-147961 | 9/2016 |
| WO | WO 2016/147962 | 9/2016 |
| WO | WO 2016/199910 | 12/2016 |
| WO | WO 2016/199911 | 12/2016 |
| WO | WO 2016/199912 | 12/2016 |
| WO | WO 2016/199913 | 12/2016 |
| WO | WO 2016/199914 | 12/2016 |
| WO | WO 2016/199915 | 12/2016 |
| WO | WO 2017/158740 | 9/2017 |

\* cited by examiner

| | SLOPE | RATE OF CHANGE RELATIVE TO S1 |
|---|---|---|
| S1 | 10663194 | |
| S2 | 4040830 | ~ 1/2.6 TIMES |
| S3 | 1989789 | ~ 1/5.3 TIMES |
| S4 | 1346363 | ~ 1/7.92 TIMES |
| S5 | 1009772 | ~ 1/10.56 TIMES |
| S6 | 807818 | ~ 1/13.2 TIMES |

ACTUAL MEASUREMENT: S1, S2, S3
ESTIMATED VALUE: S4, S5, S6

CALCULATE AMOUNT OF CHANGE IN SLOPE OF CALIBRATION CURVE DETERMINED BY ACTUAL MEASUREMENT
↓
ESTIMATE SLOPE OF CALIBRATION CURVE

| | SLOPE | RATE OF CHANGE RELATIVE TO V1 |
|---|---|---|
| V1 | 875472 | |
| V2 | 3320870 | ~ 3 TIMES |
| V3 | 5203730 | ~ 6 TIMES |
| V4 | 7879248 | ~ 9 TIMES |
| V5 | 10505664 | ~ 12 TIMES |

ACTUAL MEASUREMENT: V1, V2, V3
ESTIMATED VALUE: V4, V5

CALCULATE AMOUNT OF CHANGE IN SLOPE OF CALIBRATION CURVE DETERMINED BY ACTUAL MEASUREMENT
↓
ESTIMATE SLOPE OF CALIBRATION CURVE

FIG. 3

| | SLOPE | RATE OF CHANGE RELATIVE TO S1V1 |
|---|---|---|
| S1V1 | 82163282 | |
| S2V1 | 20867467 | ~ 0.24 TIMES |
| S3V1 | 7600946 | ~ 0.1 TIMES |
| S4V1 | 4108164 | ~ 0.05 TIMES |
| S5V1 | 2464898 | ~ 0.03 TIMES |
| S6V1 | 1068123 | ~ 0.013 TIMES |

ACTUAL MEASUREMENT: S1V1, S2V1, S3V1
ESTIMATED VALUE: S4V1, S5V1, S6V1

ESTIMATE DEGREE OF CONTRIBUTION OF S OR V FROM AMOUNT OF CHANGE IN SLOPE OF CALIBRATION CURVE DETERMINED BY ACTUAL MEASUREMENT
↓
ESTIMATE SLOPE OF CALIBRATION CURVE WHILE TAKING INTO CONSIDERATION DEGREE OF CONTRIBUTION

FIG. 4

| | SLOPE | RATE OF CHANGE RELATIVE TO S1V1 |
|---|---|---|
| S1V1 | 82163282 | |
| S1V2 | 246489846 | ~ 3 TIMES |
| S1V3 | 492979692 | ~ 6 TIMES |
| S1V4 | 739469538 | ~ 9 TIMES |

ACTUAL MEASUREMENT: S1V1
ESTIMATED VALUE: S1V2, S1V3, S1V4

ASSESS THAT CONTRIBUTION OF NUMBER OF VINYL CHAINS IS LARGE, AND ESTIMATE SLOPE OF CALIBRATION CURVE

FIG. 5

RUBBER COMPOSITION AND PNEUMATIC TIRE USING SAME

CROSS-REFERENCE TO RELATED APPLICATIONS

This application is a 371 National Stage Application, which claims the benefit of International Application No. PCT/JP2017/017051, filed on Apr. 28, 2017, which claims priority to Japanese Patent Application No. 2016-094648, filed on May 10, 2016, the contents of which are hereby incorporated by references in their entirety.

TECHNICAL FIELD

The present technology relates to a rubber composition which improves low heat build-up to or beyond levels in the related art while retaining wear resistance, and to a pneumatic tire using the same.

BACKGROUND ART

In recent years, there have been demands for high wet grip performance and low rolling resistance in pneumatic tires. A known technique for satisfying these demands is to blend a styrene-butadiene copolymer or a reinforcing filler such as silica into a rubber composition constituting the cap tread of a tire. Further, in order to enhance the wear resistance, rubber hardness, or modulus of repulsion elasticity of the rubber composition, it has been proposed to blend a polybutadiene or silica having high reactivity, for example, but this is problematic in that the rubber strength decreases or the workability deteriorates.

Japan Unexamined Patent Publication No. 03-239737 discloses that a pneumatic tire in which a rubber composition prepared by blending a styrene-butadiene copolymer having a specific sequence of styrene units and silica is used for a tread simultaneously satisfies wet skid resistance, rolling resistance, and wear resistance. However, this rubber composition is not necessarily able to sufficiently enhance wear resistance and low heat build-up, and is therefore unable to sufficiently satisfy the demands of consumers.

Japan Unexamined Patent Publication No. 57-179212 discloses that an ozone-decomposed product of a styrene-butadiene copolymer is analyzed by gel permeation chromatography (GPC), and the content ratio of a long-chain styrene block and the content ratio of a simple chain with one styrene unit with respect to the total styrene content are measured. A styrene-butadiene copolymer in which the long-chain styrene block content is not greater than 5 wt. % and the simple chain content with one styrene unit is not less than 50 wt. % with respect to the total styrene content in the styrene-butadiene copolymer, and the total styrene content is from 10 to 30% of the styrene-butadiene copolymer is then further disclosed. However, a rubber composition made of this styrene-butadiene copolymer is not necessarily able to sufficiently enhance the rubber strength, wear resistance, and low hysteresis loss thereof. In addition, in the GPC-based analysis in Japan Unexamined Patent Publication No. 57-179212, even in a case where the ozone-decomposed product of the styrene-butadiene copolymer can be classified based on the number of styrene units and a chain made of only styrene units, the number of units derived from 1,2-bonds of butadiene in the ozone-decomposed product cannot be identified. Further, in the GPC-based analysis disclosed in Japan Unexamined Patent Publication No. 57-179212, the ratio of the styrene content in the decomposition product to the total styrene content is calculated, and the amount of each decomposition product is not accurately quantified.

SUMMARY

The present technology provides a rubber composition that exhibits improved low heat build-up up to or beyond levels in the related art while retaining wear resistance.

A rubber composition includes a diene rubber component containing a styrene-butadiene copolymer component including at least one type of styrene-butadiene copolymer, and a reinforcing filler; wherein the styrene-butadiene copolymer component has the following characteristics (1) to (4):

(1) the bonded styrene content is from 5 to 50 wt. %;
(2) of components obtained by ozone decomposition, a content of a decomposed component V1 containing one 1,2-bonded butadiene-derived unit out of a total of 100 mol % of decomposed components containing styrene-derived unit(s) and/or the 1,2-bonded butadiene-derived unit(s) is not less than 25 mol %;
(3) of the components obtained by ozone decomposition, a content of a decomposed component S2V1 containing two of the styrene-derived units and one of the 1,2-bonded butadiene-derived unit out of a total of 100 mol % of the decomposed components containing the styrene-derived unit(s) and/or the 1,2-bonded butadiene-derived unit(s) is not less than 5 mol %; and
(4) a vinyl content of a butadiene moiety is not less than 50%.

According to the configuration described above, the rubber composition of the present technology is configured to include a diene rubber component containing a styrene-butadiene copolymer component and a reinforcing filler so as to satisfy the following requirements: (1) the bonded styrene content is from 5 to 50 wt. %; (2) of components obtained by ozone decomposition, a content of a decomposed component V1 containing one 1,2-bonded butadiene-derived unit out of a total of 100 mol % of decomposed components containing styrene-derived unit(s) and/or the 1,2-bonded butadiene-derived unit(s) is not less than 25 mol %; (3) of the components obtained by ozone decomposition, a content of a decomposed component S2V1 containing two of the styrene-derived units and one of the 1,2-bonded butadiene-derived unit out of a total of 100 mol % of the decomposed components containing the styrene-derived unit(s) and/or the 1,2-bonded butadiene-derived unit(s) is not less than 5 mol %; and (4) a vinyl content of a butadiene moiety is not less than 50%. Therefore, the rubber composition of the present technology can exhibit improved low heat build-up up to or beyond conventional levels while retaining wear resistance.

The diene rubber component described above may contain at least another type of the diene rubber component other than the styrene-butadiene copolymer component described above. In addition, the reinforcing filler may be at least one type selected from silica and carbon black.

The rubber composition described above is suitable for use in a pneumatic tire and may be used in a cap tread, in particular. This pneumatic tire has excellent fuel economy performance and can exhibit improved wear resistance up to or beyond levels in the related art.

BRIEF DESCRIPTION OF DRAWINGS

FIG. 3 is an explanatory diagram illustrating the relationship between a chain component and the slope of the calibration curve, and the slope of an estimated calibration curve.

FIG. 4 is an explanatory diagram illustrating the relationship between another chain component and the slope of the calibration curve, and the slope of an estimated calibration curve.

FIG. 5 is an explanatory diagram illustrating the relationship between yet another chain component and the slope of the calibration curve, and the slope of an estimated calibration curve.

DETAILED DESCRIPTION

Figure 6:
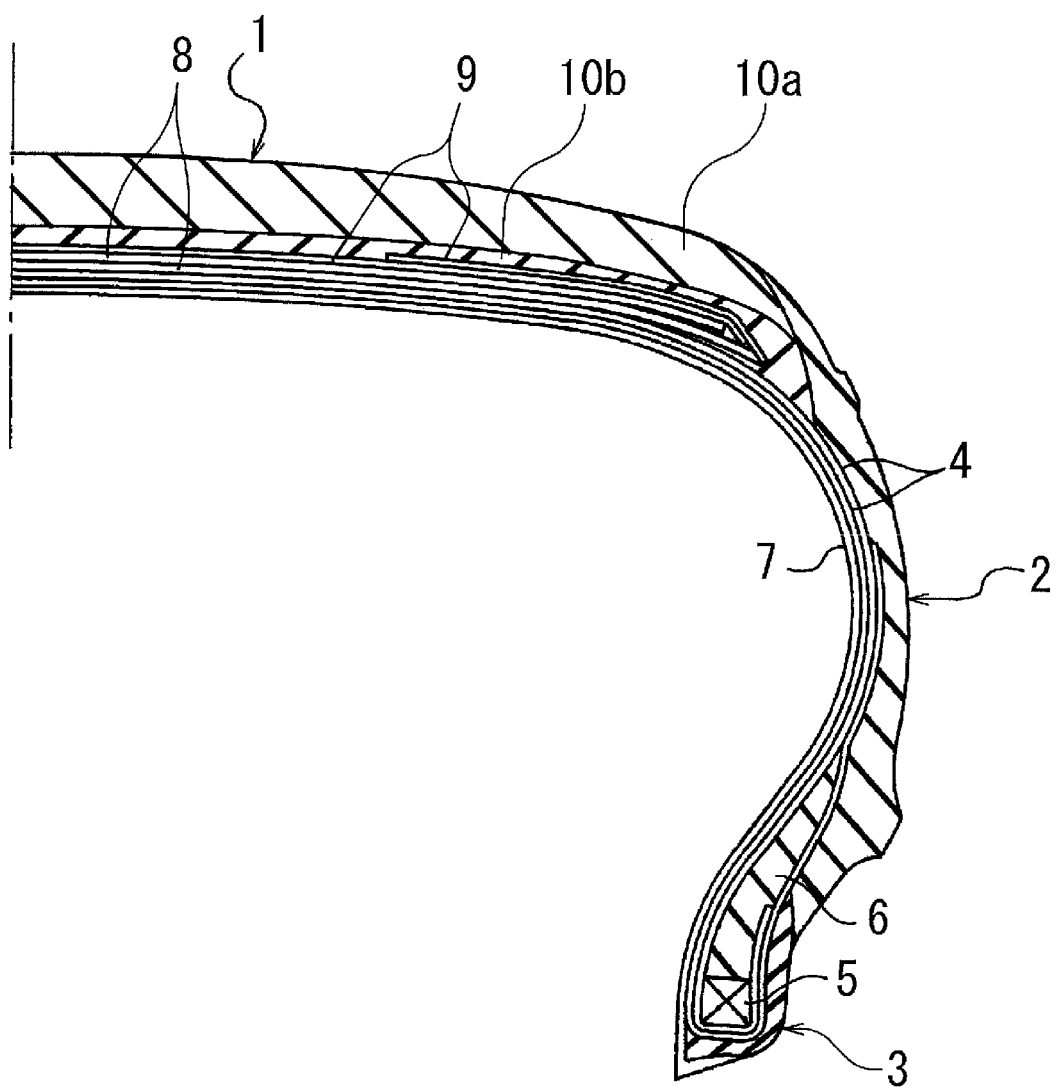
FIG. 6 is a partial cross-sectional view in a tire meridian direction that illustrates an example of an embodiment of a pneumatic tire in which a rubber composition according to an embodiment of the present technology is used.

FIG. 6 is a partial cross-sectional view illustrating an example of an embodiment of a pneumatic tire in which a rubber composition is used. The pneumatic tire is formed from a tread portion 1, a sidewall portion 2, and a bead portion 3.

In FIG. 6, two carcass layers 4, formed by arranging reinforcing cords extending in a tire radial direction at a predetermined pitch in the tire circumferential direction and embedding these reinforcing cords in a rubber layer, extend between left and right bead portions 3. Both ends thereof are made to sandwich bead fillers 6 and are folded back around bead cores 5 that are embedded in the bead portions 3 in a tire axial direction from the inside to the outside. An innerliner 7 is disposed inward of the carcass layers 4. Two layers of a belt layer 8, formed by arranging reinforcing cords extending inclined to the tire circumferential direction in the tire axial direction at a predetermined pitch and embedding these reinforcing cords in the rubber layer, is disposed on an outer circumferential side of the carcass layer 4 of the tread portion 1. The reinforcing cords of the two belt layers 8 intersect such that the inclination directions of the two belt layers 8 with respect to the tire circumferential direction are opposite each other in the tire circumferential direction. A belt cover layer 9 is disposed outward of the belt layers 8. The tread portion 1 is formed from tread rubber layers 10a and 10b on the outer circumferential side of the belt cover layer 9. The tread rubber layers 10a and 10b are a cap tread and a base tread and may preferably be made of the rubber composition of the present technology.

The rubber composition of the present technology includes a diene rubber component and a reinforcing filler. The diene rubber component necessarily contains at least one type of styrene-butadiene copolymer. In this description, a polymer component including at least one type of styrene-butadiene copolymer may also be called a "styrene-butadiene copolymer component". In the present technology, the styrene-butadiene copolymer component satisfies all of the following characteristics (1) to (4):

(1) the bonded styrene content is from 5 to 50 wt. %;

(2) of components obtained by ozone decomposition, a content of a decomposed component V1 containing one 1,2-bonded butadiene-derived unit out of a total of 100 mol % of decomposed components containing styrene-derived unit(s) and/or the 1,2-bonded butadiene-derived unit(s) is not less than 25 mol %;

(3) of the components obtained by ozone decomposition, a content of a decomposed component S2V1 containing two of the styrene-derived units and one of the 1,2-bonded butadiene-derived unit out of a total of 100 mol % of the decomposed components containing the styrene-derived unit(s) and/or the 1,2-bonded butadiene-derived unit(s) is not less than 5 mol %; and (4) a vinyl content of a butadiene moiety is not less than 50%.

When the styrene-butadiene copolymer component is made of a single styrene-butadiene copolymer, the styrene-butadiene copolymer must satisfy all of the characteristics (1) to (4) described above.

In addition, when the styrene-butadiene copolymer component is made of a blend of a plurality of styrene-butadiene copolymers, the styrene-butadiene copolymer component must satisfy all of the characteristics (1) to (4) described above on the whole. As long as the styrene-butadiene copolymer component satisfies all of the characteristics (1) to (4) on the whole, individual styrene-butadiene copolymers forming the blend may or may not satisfy all of the characteristics (1) to (4) described above. The individual styrene-butadiene copolymers forming the blend preferably satisfy all of the characteristics (1) to (4). By forming the styrene-butadiene copolymer component from two or more types of styrene-butadiene copolymers satisfying all of the characteristics (1) to (4), the wear resistance and low heat build-up of the rubber composition can be enhanced.

In the present technology, the styrene-butadiene copolymer component (1) has a bonded styrene content from 5 to 50 wt. % and preferably from 10 to 40 wt. %. By setting the styrene content of the styrene-butadiene copolymer component within such a range, the balance between the wear resistance and rubber strength of the rubber composition and the low heat build-up and wet skid characteristics can be enhanced. In a case where the styrene content of the styrene-butadiene copolymer component is less than 5 wt. %, the wet skid characteristics, wear resistance, and rubber strength will deteriorate. In a case where the styrene content of the styrene-butadiene copolymer component exceeds 50 wt. %, the glass transition temperature (Tg) of the styrene-butadiene copolymer component will rise, the balance between viscoelastic characteristics will worsen, and it will be difficult to obtain the effects of reducing heat build-up. That is, the balance between the hysteresis loss and wet skid characteristics will be deteriorates. Note that the styrene content of the styrene-butadiene copolymer component is measured by $^1$H-NMR (proton nuclear magnetic resonance).

After the decomposed components resulting from ozone decomposition of the styrene-butadiene copolymer component used in the present technology are separated in two stages by liquid chromatography using two columns with different characteristics, the components are measured with a mass spectrometer (also called "LC×LCMS analysis" hereafter). The composition and volume of ozone decomposed components can be analyzed in detail with this LC×LCMS analysis, and the 1,2-bonded butadiene-derived units can be quantified in addition to the styrene-derived units in the ozone-decomposed components.

A styrene-butadiene copolymer is a copolymer of styrene and butadiene and includes repeating units of styrene (styrene units) and repeating units of butadiene (butadiene units). The butadiene units include a portion in which butadiene is polymerized by 1,2-bonds (repeating units of ethylene having a vinyl group in the side chain) and a portion in which butadiene is polymerized by 1,4-bonds (repeating units of a divalent group of 2-butylene). In addition, the portion polymerized by 1,4-bonds includes repeating units with the trans-2-butylene structure and repeating units with the cis-2-butylene structure.

When the styrene-butadiene copolymer is ozone-decomposed, the butadiene moiety polymerized by 1,4-bonds is cleaved. In addition, the vinyl groups in the side chain of the butadiene moiety polymerized by 1,2-bonds are oxidized to form hydroxymethyl groups. As a result, in the styrene-butadiene copolymer, repeating units sandwiched between two adjacent butadiene units polymerized by a 1,4-bonds are produced as ozone-decomposed components. For example, when a portion in which only one 1,2-bonded butadiene in a main chain is sandwiched between two butadiene units polymerized by 1,4-bonds is ozone-decomposed, a compound represented by the following general formula (I) is produced. In this description, a composition represented by General Formula (I) is called an "ozone-decomposed component V1". Note that in this description, the direction of linkage with adjacent units may be either a head-to-tail bond or a head-to-head bond, and head-to-tail bonds/head-to-head bonds expressed by the chemical formula are interchangeable with one another.

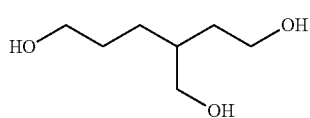

(I)

In addition, when a portion in which two styrene units and one butadiene units polymerized by 1,2-bonds in a main chain are sandwiched between adjacent butadiene units polymerized by 1,4-bonds is ozone-decomposed, a compound represented by General Formula (II) below is produced. In this description, a decomposed component including two styrene-derived units and one butadiene-derived unit polymerized by 1,2-bonds is called an "ozone-decomposed component S2V1".

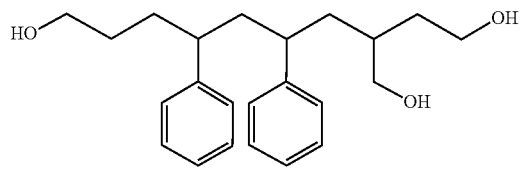

(II)

Note that the compound represented by General Formula (II) described above also includes compounds in which at least one element selected from the sequence of the two styrene-derived units and the one 1,2-bonded butadiene-derived unit, the head-to-tail bonds/head-to-head-bonds, and the sequence thereof differs.

The portion sandwiched between two adjacent butadiene units polymerized by 1,4-bonds as described above, when ozone-decomposed, results in a decomposed component in which styrene-derived unit(s) and/or a 1,2-bonded butadiene-derived unit are sandwiched by hydroxyethyl groups at both ends due to ozone decomposition. In addition, 1,4-butanediol is produced from the repeating portion having two or more consecutive butadiene units polymerized by 1,4-bonds.

When the decomposed components obtained by ozone-decomposing the styrene-butadiene copolymer component used in the present technology are measured by LC×LCMS analysis, (2) of components obtained by ozone decomposition, the content of a decomposed component V1 containing one 1,2-bonded butadiene-derived unit out of a total of 100 mol % of the decomposed components containing styrene-derived unit(s) and/or the 1,2-bonded butadiene-derived unit(s) is not less than 25 mol %. A decomposed component containing one 1,2-bonded butadiene derived unit refers to an ozone-decomposed component V1 containing only one 1,2-bonded butadiene-derived unit, as described above. The number of moles of each decomposed component is determined by measuring the ozone-decomposed component using LC×LCMS analysis. Next, the total number of moles of the decomposed components including styrene-derived units and/or 1,2-bonded butadiene-derived units produced by ozone decomposition is calculated, and this is defined as 100 mol % of the ozone-decomposed components. The amount of the decomposed component V1 containing one 1,2-bonded butadiene-derived unit is not less than 25 mol % and is preferably not less than 30 mol % and less than 50 mol % out of 100 mol % of the ozone-decomposed components. By setting the content of the ozone-decomposed component V1 at not less than 25 mol %, the low heat build-up and the modulus of repulsion elasticity can be enhanced. In addition, the wear resistance can be maintained and improved.

In addition to the above, the styrene-butadiene copolymer component used in the present technology, (3) when the decomposed components obtained by ozone-decomposing the styrene-butadiene copolymer component used in the present technology are measured by LC×LCMS analysis, the content of a decomposed component S2V1 containing two styrene-derived units and one 1,2-bonded butadiene-derived unit is not less than 5 mol %, preferably from 5 to 10 mol %. Here, the ozone-decomposed component S2V1 is an ozone-decomposed component containing two styrene-derived units and one 1,2-bonded butadiene-derived unit, as described above, and corresponds to the decomposed component represented by General Formula (II) described above. The number of moles of the decomposed component represented by General Formula (II) is determined by measuring the ozone-decomposed components using LC×LCMS analysis. When the total number of moles of the decomposed components containing styrene-derived units and/or 1,2-bonded butadiene-derived unit is calculated and defined as 100 mol % of the ozone-decomposed components, the content of the decomposed component S2V1 containing two styrene-derived units and one 1,2-bonded butadiene-derived unit is required to be not less than 5 mol %. This can lead to enhanced low heat build-up. In addition, the wear resistance can be maintained or improved.

In this description, the method of ozone-decomposing the styrene-butadiene copolymer component and measuring the ozone-decomposed product are performed in accordance with the methods disclosed in Tanaka et al. "Polymer, 22, 1721 (1981)" and "Macromolecules, 16, 1925 (1983)". Note that in the analytical methods disclosed by Tanaka et al., an ozone-decomposed component S1 containing only one styrene-derived unit and an ozone-decomposed component S1Vn (where n is an integer of 1 or greater) containing one styrene-derived unit and one or more 1,2-bonded butadiene-derived units are collectively called a "single-styrene chain". In contrast, in the present technology, as described above, analysis is performed individually by LC×LCMS analysis while focusing on the numbers of moles of the ozone-decomposed component S1 containing only one styrene-derived unit and the ozone-decomposed component S2V1 containing two styrene-derived units and one 1,2-bonded butadiene-derived unit.

In this description, the conditions for measuring the ozone-decomposed components with LC×LCMS analysis may be as follows.

Liquid chromatograph: comprehensive two-dimensional LC Nexera-e (available from Shimadzu Corporation)

Mass spectrometer: LCMS-8040 or LCMS-8050 (both available from Shimadzu Corporation)

First-dimensional column: A total of three columns were linked in series and used, including two columns (A) in which the stationary phase is a polymer gel (Shodex Mspak GF-310 2D available from Showa Denko K.K., inner diameter: 2.0 mm, length: 150 mm, particle size: 5 μm) and one column (B) in which the stationary phase is a polymer gel (Super HZ 1000 available from TOSOH Corporation, inner diameter: 2.0 mm, length 250 mm, particle size: 3 μm).

Injection volume: 1 μL (sample solution concentration: 10 mg/mL)

Mobile phase: THF

Flow rate: 0.02 mL/min

Second-dimensional column: Column (A) in which the stationary phase is a core-shell polymer modified by an octadecyl group (Kinetex C18 available from Phenomenex inc., inner diameter: 3.0 mm, length: 50 mm, particle size: 2.6 μm)

Mobile phase A: water:methanol is 1:1.

Mobile phase B: methanol Flow rate: 2.0 mL/min

Time program: B conc. 20% (0 min), 100% (0.75 min), 20% (0.76 min), and STOP (1 min)

Interface temperature: 350° C.

Desolventizing temperature: 200° C.

Interface voltage: 4.5 V

Interface (ionization method): (APCI positive mode) Mass spectrometry conditions: SIM (Selected Ion Monitoring) measurements, 9 events (ev1: S1-S1V10, ev2: S2-S2V10, ev3:S3-S3V10, ev4: S4-S4V10, ev5: S5-S5V10, ev6: S6-S6V10, ev7: S7-S7V10, ev8: S8-S8V10, ev9: V1-V10), total of 98 ch SIM and individual SIM: 98 events (for calibration curve creation), total of 107 events Detection ion: protonated ion (m/z=[M+H]+)

Here, a commercially available sample may be used for a standard sample, or a sample isolated from an ozone-decomposed product of styrene-butadiene rubber (SBR) and a purity of which has been calculated by NMR (nuclear magnetic resonance) or the like may be used. For example, standard samples may be prepared as follows.

A solution-polymerized SBR having a styrene content of 36 wt. % and a vinyl content in butadiene of 42% was subjected to ozone decomposition treatment, and a total of seven components, S1, S1V1, S2, S2V1, S3, S3V1, and V1, were batched off with a chloroform solvent using LC-9104 (preparative GPC) available from Japan Analytical Industry Co., Ltd. and four low-molecular-weight columns (two of each of JAIGEL-1H and JAIGEL-2H). The purity was calculated by NMR, and these components were used as standard samples.

Polybutadiene having a vinyl content of 70% was subjected to ozone decomposition treatment, and after the dissolution times of the components were first confirmed under the mass spectrometry ionization condition APCI+ in a gradient measurement of 20% B-100% B for 40 minutes at a flow rate of 1 mL/min and an injection volume of 0.2 μL using a column (VP-ODS 150 mm×4.6 mm) and using water as a mobile phase A and methanol as a mobile phase B in an HPLC system Prominence available from Shimadzu Corporation), V1, V2, and V3 were batched off at these times. The purity was calculated by NMR, and these were used as standard samples.

In addition, LC×LCMS analysis may be performed in accordance with the following operations.

Analysis is performed using LCMS-8040 (product name) or LCMS-8050 (product name) available from Shimadzu Corporation, and the standard samples obtained as described above are measured using the APCI (atmospheric pressure chemical ionization) positive MS (mass spectrometry) mode.

Figure 1:
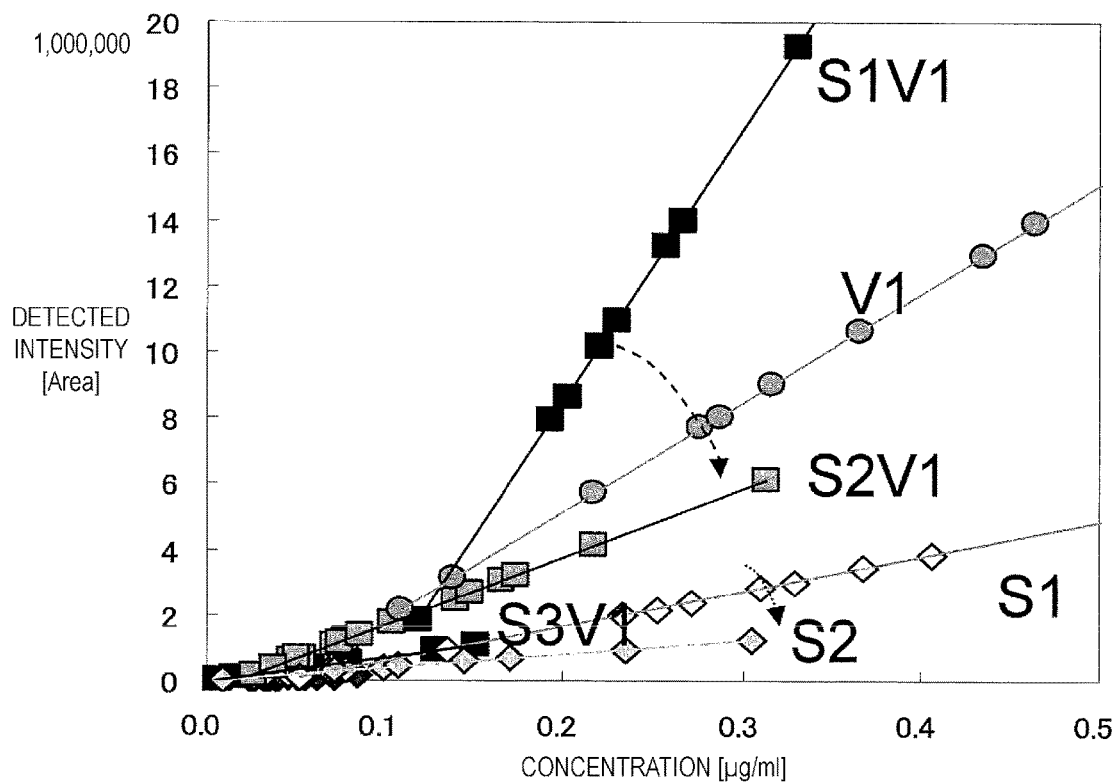
FIG. 1 is an example of a calibration curve illustrating the correlation between the concentration and ionic strength of each standard sample.
Figure 2:
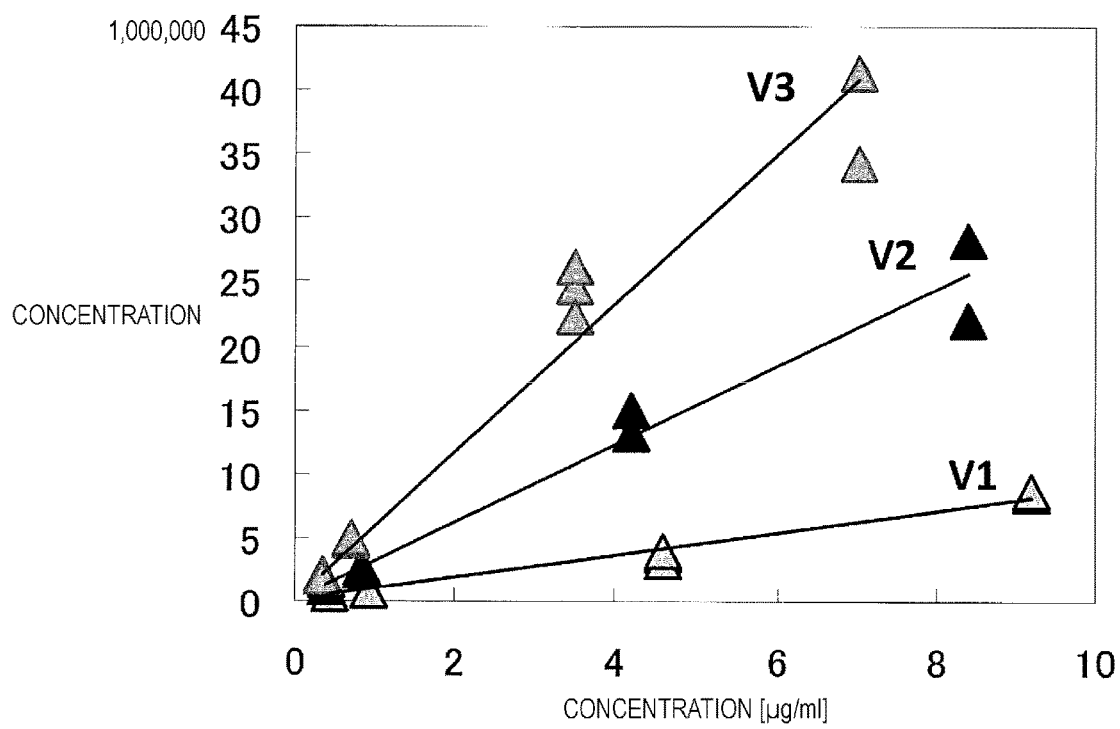
FIG. 2 is another example of a calibration curve illustrating the correlation between the concentration and ionic strength of each standard sample.

Based on the detection results of the mass spectrometer, a correlation diagram (calibration curve) of the concentration and ionic strength of each standard sample was created. The created correlation diagrams are illustrated in FIGS. 1 and 2. In FIGS. 1 and 2, symbols such as "S1V1", "V1", and "S2" represent the number of 1,2-bonded butadiene-derived units and the number of styrene-derived units of the compound corresponding to the calibration curve. For example, the symbol "S1V1" indicates that the compound has one 1,2-bonded butadiene-derived unit and one styrene-derived unit. As can be seen from FIGS. 1 and 2, it is clear that the calibration curves differ depending on the number of styrene-derived units and the number of 1,2-bonded butadiene-derived units contained in the compound.

Calibration Curve Estimate

In the case of SBR with an unknown structure, ozone-decomposed components include various types thereof, and a qualitative analysis of all decomposed components cannot be made with only the calibration curves of the compounds illustrated in FIGS. 1 and 2. Therefore, calibration curves of decomposed components having an unknown mass-charge ratio were estimated from the calibration curves determined for the standard samples described above.

Specifically, for a chain component Sn containing only styrene, the amount of change in the slope of the calibration curve when the number of chains of styrene increases by one was determined by calculation from the calibration curves of 51 to S3, and the slope of the chain component Sn (n>4) was estimated. The slope of the calibration curve was estimated with a similar method for a chain component (Vm) including 1,2-bonded butadiene-derived units. The slopes of the estimated calibration curves are illustrated in FIG. 3.

On the other hand, for a chain component (SnVm) containing styrene-derived units and 1,2-bonded butadiene-derived units, the degrees of contribution of the styrene and 1,2-bonded butadiene-derived units to the slope of the calibration curve were determined from the amount of change in the slope when the number of chains of styrene was fixed and the number of chains of 1,2-bonded butadiene was varied and the amount of change in the slope when the number of chains of 1,2-bonded butadiene was fixed and the number of chains of styrene was varied, and the slope of the calibration curve of the chain component SnVm was estimated from the degrees of contribution and the numbers of chains of styrene and 1,2-bonded butadiene-derived units. FIGS. 3 to 5 illustrate the slopes of the calibration curves of chain components determined from the results of actual measurements and the slopes of the calibration curves estimated in accordance with the method described above.

Creation of Two-Dimensional Chromatogram

Next, the ozone-decomposed product was analyzed by LC×LCMS. The devices and analysis conditions used for analysis are the same as those used for the creation of the calibration curves.

The detection results of the mass spectrometer were analyzed using ChromSquare analysis software (available from Shimadzu Corporation), and a two-dimensional chromatogram was created, wherein the elution time of the primary column is expressed by the horizontal axis, the elution time of the secondary column is expressed by the vertical axis, and the signal intensity is expressed by contour lines. By using LC×LC, even components such as S2V1 and S1V1 with very similar elution times can be separated, so the chain structures including the styrene-derived unit(s) and 1,2-bonded butadiene-derived unit(s) contained in the sample can be identified.

The styrene-butadiene copolymer component used in the present technology, (4) the vinyl content of the butadiene moiety is not less than 50%, preferably from 50 to 65%. By setting the vinyl content of the butadiene moiety at not less than 50% in the styrene-butadiene copolymer component, the wear resistance of the rubber composition can be maintained or improved, and the balance between the hysteresis loss and wet skid characteristics can be enhanced. That is, by setting the vinyl content of the butadiene moiety at not less than 50%, the rubber strength and wear resistance can be ensured, and the hysteresis loss can be prevented from increasing. Note that the vinyl content of the butadiene moiety is measured by $^1$H-NMR.

The content of the styrene-butadiene copolymer component having the characteristics (1) to (4) is preferably not less than 40 wt. %, more preferably from 60 to 100 wt. %, and even more preferably from 80 to 100 wt. % per 100 wt. % of the diene rubber component. By setting the content of the styrene-butadiene copolymer component specified by the characteristics (1) to (4) at not less than 40 wt. %, the low heat build-up of the rubber composition can be enhanced, and the wear resistance can be maintained or improved.

The rubber composition of the present technology may contain another type of the diene rubber component other than the styrene-butadiene copolymer component satisfying all of the characteristics (1) to (4). Examples of the other type of the diene rubber component include natural rubber (NR), polyisoprene rubber (IR), polybutadiene rubber (low-cis BR), high-cis BR, high-trans BR (trans-bond content of butadiene moiety: 70 to 95%), styrene-isoprene copolymer rubber, butadiene-isoprene copolymer rubber, solution polymerized random styrene-butadiene-isoprene copolymer rubber, emulsion polymerized random styrene-butadiene-isoprene copolymer rubber, emulsion polymerized styrene-acrylonitrile-butadiene copolymer rubber, acrylonitrile-butadiene copolymer rubber, high-vinyl SBR-low-vinyl SBR block copolymer rubber, polyisoprene-SBR block copolymer rubber, and polystyrene-polybutadiene-polystyrene block copolymers.

The content of the other type of the diene rubber component is preferably not greater than 60 wt. %, more preferably from 0 to 40 wt. %, and even more preferably from 0 to 20 wt. % per 100 wt. % of the diene rubber component. Containing another type of the diene rubber component enables the enhancement of various physical properties such as wear resistance.

The rubber composition of the present technology contains a diene rubber component and a reinforcing filler. Examples of reinforcing fillers include inorganic fillers such as carbon black, silica, clay, aluminum hydroxide, calcium carbonate, mica, talc, aluminum oxide, titanium oxide, and barium sulfate, and organic fillers such as cellulose, lecithin, lignin, and dendrimer. Of these, at least one type selected from carbon black and silica is preferably compounded.

By compounding carbon black into the rubber composition, the wear resistance and rubber strength of the rubber composition can be enhanced. The compounded amount of the carbon black is not particularly limited but is preferably from 10 to 100 parts by weight and more preferably from 25 to 80 parts by weight per 100 parts by weight of the diene rubber component.

Carbon black such as furnace black, acetylene black, thermal black, channel black, and graphite may be compounded as carbon black. Of these, furnace black is preferably used. Specific examples include SAF (Super Abrasion Furnace), ISAF (Intermediate Super Abrasion Furnace), ISAF-HS (Intermediate Super Abrasion Furnace High Structure), ISAF-LS (Intermediate Super Abrasion Furnace Low Structure), IISAF-HS (Intermediate Intermediate Super Abrasion Furnace High Structure), HAF (High Abrasion Furnace), HAF-HS (High Abrasion Furnace High Structure), HAF-LS (High Abrasion Furnace Low Structure), and FEF (Fast Extruding Furnace). These carbon blacks may each be used alone, or in combination with two or more types of carbon blacks. In addition, surface-treated carbon blacks in which these carbon blacks are chemically modified by various acid compounds or the like may also be used.

Further, by compounding silica into the rubber composition, the low heat build-up and wet grip performance of the rubber composition can be enhanced. The compounded amount of the silica is not particularly limited but is preferably from 10 to 150 parts by weight and more preferably from 40 to 100 parts by weight per 100 parts by weight of the diene rubber component.

The silica may be any silica that is regularly used in rubber compositions for use in tire treads, and examples thereof include wet silica, dry silica, or surface-treated silica which is surface-treated by a compound which is reactive or compatible with both silica and rubber such as carbon-silica in which silica is supported on a carbon black surface (dual-phase filler), a silane coupling agent, or a polysiloxane. Of these, a wet silica having hydrous silicic acid as a main component is preferably used.

In the present technology, the compounded amount of the reinforcing filler containing silica and/or carbon black is preferably from 10 to 150 parts by weight and more preferably from 40 to 100 parts by weight per 100 parts by weight of the diene rubber component. When the compounded amount of the reinforcing filler is less than 10 parts by weight, the reinforcing performance cannot be sufficiently achieved, and the rubber hardness and tensile strength at break become insufficient. In addition, when the compounded amount of the reinforcing filler exceeds 150 parts by weight, heat build-up increases, while tensile elongation at break decreases. Moreover, the wear resistance and workability are also deteriorated.

Because the rubber composition of the present technology contains a silane coupling agent as well as a silica, the low heat build-up and wear resistance are further enhanced, which is preferable. Because a silane coupling agent is blended together with the silica, the dispersibility of the silica is improved, and the reinforcement action with the diene rubber component is further increased. The compounded amount of the silane coupling agent is preferably from 2 to 20 wt. % and more preferably from 5 to 15 wt. % relative to the compounded amount of the silica. If the compounded amount of the silane coupling agent is less than 2 wt. % relative to the weight of the silica, the dispersion of the silica cannot be sufficiently achieved. In addition, if the compounded amount of the silane coupling agent exceeds 20 wt. %, the diene rubber component will tend to be easily gelified, so the desired effect cannot be achieved.

The silane coupling agent is not particularly limited, and a sulfur-containing silane coupling agent is preferable.

Examples thereof include bis(3-triethoxysilylpropyl)tetrasulfide, bis(3-triethoxysilylpropyl)trisulfide, bis(3-triethoxy silylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyldimethoxymethylsilane, 3-mercaptopropyldimethylmethoxysilane, 2-mercaptoethyltriethoxysilane, 3-mercaptopropyltriethoxysilane, mercaptosilane compounds disclosed in JP 2006-249069 A such as VP Si363 manufactured by Evonik Corporation, 3-trimethoxysilylpropyl benzothiazole tetrasulfide, 3-triethoxysilylpropyl benzothiazolyl tetrasulfide, 3-triethoxysilylpropyl methacrylate monosulfide, 3-trimethoxysilylpropyl methacrylate monosulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, bis(3-diethoxymethylsilylpropyl)tetrasulfide, dimethoxymethylsilylpropyl-N,N-dimethylthiocarbamoyl tetrasulfide, dimethoxymethylsilylpropyl benzothiazolyl tetrasulfide, 3-octanoylthiopropyl triethoxysilane, 3-propionylthiopropyl trimethoxysilane, vinyl trimethoxysilane, vinyl triethoxysilane, vinyl tris(2-methoxyethoxy)silane, 3-glycidoxypropyl trimethoxysilane, 3-glycidoxypropylmethyl dimethoxysilane, β-(3,4-epoxy cyclohexyl)ethyltrimethoxysilane, 3-aminopropyl trimethoxysilane, N-(β-aminoethyl)-γ-aminopropyl trimethoxysilane, and N-(β-aminoethyl)-γ-aminopropylmethyl dimethoxysilane. In addition, the silane coupling agent may be an organic silicon compound, and examples of organic silicon compounds include polysiloxane, silicone oils in which one or more organic group such as an amino group, an epoxy group, a carbinol group, a mercapto group, a carboxyl group, a hydrogen group, a polyether group, a phenol group, a silanol group, an acryl group, a methacryl group, or a long-chain alkyl group is introduced in the side chain, both ends, one end, or the side chain and both ends of polysiloxane, and silicone oligomers obtained by subjecting one or more types of organic silanes to a condensation reaction. Of these, bis-(3-triethoxysilylpropyl)tetrasulfide and bis(3-(triethoxysilyl) propyl) disulfide are preferable.

In accordance with conventional methods, the rubber composition of the present technology may also include, in addition to the components described above, various compounding agents that are commonly used in rubber compositions for use in tire treads. Examples thereof include vulcanization or crosslinking agents, vulcanization accelerators, anti-aging agents, processing aids, plasticizers, liquid polymers, thermosetting resins, thermoplastic resins, and the like. These compounding agents can be kneaded by a common method to obtain a rubber composition including these compounding agents, which can then serve for vulcanization or crosslinking. These compounding agents can be blended at known, typical compounded amounts so long as the objects of the present technology are not hindered. The rubber composition for use in tire treads can be prepared by mixing the above-mentioned components using a well-known rubber kneading machine such as a Banbury mixer, a kneader, a roll mill, or the like.

The vulcanizing or crosslinking agent is not particularly limited, and examples thereof include sulfurs such as powdered sulfur, precipitated sulfur, colloidal sulfur, insoluble sulfur, and high-dispersive sulfur; halogenated sulfurs such as sulfur monochloride and sulfur dichloride; and organic peroxides such as dicumyl peroxide and di-tert-butylperoxide. Of these, sulfur is preferable, and powdered sulfur is particularly preferable. These vulcanizing or crosslinking agents may each be used alone, or a in combination with two or more types thereof. The compounding ratio of the vulcanizing agent is ordinarily from 0.1 to 15 parts by weight, preferably from 0.3 to 10 parts by weight, and even more preferably from 0.5 to 5 parts by weight per 100 parts by weight of the diene rubber component.

The vulcanization accelerator is not particularly limited, but examples thereof include sulfenamide-based vulcanization accelerators such as N-cyclohexyl-2-benzothiazyl sulfenamide, Nt-butyl-2-benzothiazol sulfenamide, N-oxyethylene-2-benzothiazol sulfenamide, and N,N'-diisopropyl-2-benzothiazol sulfenamide; guanidine-based vulcanization accelerators such as diphenyl guanidine, di-o-tolyl guanidine, and o-tolyl biguanidine; thiourea-based vulcanization accelerators such as diethylthiourea; thiazole-based vulcanization accelerators such as 2-mercaptobenzothiazole, dibenzothiazyl sulfide, and 2-mercaptobenzothiazole zinc salt; thiuram-based vulcanization accelerators such as tetramethylthiuram monosulfide and tetramethylthiuram disulfide; dithiocarbamic acid-based vulcanization accelerators such as sodium dimethyldithiocarbamate and zinc diethyldithiocarbamate; and xanthogenic acid-based vulcanization accelerators such as sodium isopropylxanthate, zinc isopropylxanthate, and zinc butylxanthate. Of these, a composition containing a sulfenamide-based vulcanization accelerator is particularly preferable. These vulcanization accelerators may each be used alone, or in combination with two or more types thereof. The compounded amount of the vulcanization accelerator is preferably from 0.1 to 15 parts by weight and more preferably from 0.5 to 5 parts by weight per 100 parts by weight of the diene rubber component.

The anti-aging agent is not particularly limited, but examples thereof include amine-based anti-aging agents such as 2,2,4-trimethyl-1,2-dihydroquinoline polymers, p,p'-dioctyldiphenylamine, N,N'-diphenyl-p-phenylenediamine, and N-phenyl-N'-1,3-dimethylbutyl-p-phenylenediamine; and phenol-based anti-aging agents such as 2,6-di-t-butyl-4-methylphenol and 2,2'-methylene-bis(4-methyl-6-t-butylphenol). These anti-aging agents may each be used alone, or in combination with two or more types thereof. The compounded amount of the anti-aging agent is preferably from 0.1 to 15 parts by weight and more preferably from 0.5 to 5 parts by weight per 100 parts by weight of the diene rubber component.

The processing aid is not particularly limited, and examples thereof that may be used include higher fatty acids such as stearic acid; higher fatty acid amides such as stearic acid amide; aliphatic higher amines such as stearyl amine; aliphatic higher alcohols such as stearyl alcohol; partial esters of a fatty acid and a polyhydric alcohol such as a glycerin fatty acid ester; fatty acid metal salts such as zinc stearate; and zinc oxide. The compounded amount is selected as needed, but the compounded amount of the higher fatty acid, aliphatic higher amide, higher alcohol, or fatty acid metal salt is preferably from 0.05 to 15 parts by weight and more preferably from 0.5 to 5 parts by weight per 100 parts by weight of the diene rubber component. The compounded amount of zinc oxide is preferably from 0.05 to 10 parts by weight and more preferably from 0.5 to 3 parts by weight per 100 parts by weight of the diene rubber component.

The plasticizer used as a compounding agent is not particularly limited, but an extender oil such as an aroma-based, naphthene-based, paraffin-based, or silicone-based oil may be selected depending on the application. The amount of the plasticizer that is used is ordinarily in the range of from 1 to 150 parts by weight, preferably from 2 to 100 parts by weight, and even more preferably from 3 to 60 parts by weight per 100 parts by weight of the diene rubber component. When the amount of the plasticizer being used is within this range, the reinforcing agent dispersing effect, tensile strength, wear resistance, heat resistance, and the like are balanced at a high degree. Other examples of plasticizers include diethylene glycol, polyethylene glycol, and silicone oils.

The thermosetting resin is not particularly limited, but examples thereof include thermosetting resins which are cured or polymerized by heating or by applying heat and a methylene donor, such as a resorcin-formaldehyde resin, a phenol-formaldehyde resin, a urea-formaldehyde resin, a melamine-formaldehyde resin, or a phenol derivative-formaldehyde resin, exemplified by m-3,5-xylenol-formaldehyde resin, 5-methylresorcin-formaldehyde resin, or the like, and other resins such as a guanamine resin, a diallylphthalate resin, a vinyl ester resin, a phenol resin, an unsaturated polyester resin, a furan resin, a polyimide resin, a polyurethane resin, a melamine resin, a urea resin, or an epoxy resin.

The thermoplastic resin is not particularly limited, but examples of commonly used thermoplastic resins include polystyrene resins, polyethylene resins, polypropylene resins, polyester resins, polyamide resins, polycarbonate resins, polyurethane resins, polysulfone resins, polyphenylene ether resins, and polyphenylene sulfide resins. Additional examples include aromatic hydrocarbon resins such as styrene-α-methylstyrene resins, indene-isopropenyl toluene resins, and coumarone-indene resins; dicyclopentadiene resins; hydrocarbon resins such as petroleum resins containing 1,3-pentadiene, pentene, methylbutene, or the like as a main raw material; alkylphenol resins; modified phenol resins; terpene phenol resins; terpene resins; and aromatic modified terpene resins.

Since the rubber composition of the present technology is configured so that the low heat build-up can be improved up to or beyond levels in the related art while maintaining wear resistance, the wear resistance and low rolling resistance (fuel economy performance) of a pneumatic tire can be enhanced up to or beyond levels in the related art.

The rubber composition of the present technology can be suitably used in the cap tread portion, undertread portion, sidewall portion, or bead filler portion of a pneumatic tire, a coating rubber for a cord such as a carcass layer, a belt layer, or a belt cover layer, a sectionally crescent side reinforcing rubber layer of a run-flat tire, a rim cushion portion, or the like. Thus, low rolling resistance (fuel economy performance) and wear resistance can be maintained and improved up to or beyond conventional levels in a pneumatic tire in which the rubber composition according to the present technology is used in these members.

The present technology is further explained below by Examples. However, the scope of the present technology is not limited to these Examples.

EXAMPLES

Styrene-butadiene copolymer components were prepared by blending eight types of styrene-butadiene copolymers at the compounding ratios shown in Tables 1 and 2, and (1) the bonded styrene content (wt. %), (2) the mol % of the ozone-decomposed component V1 containing one 1,2-bonded butadiene-derived unit, (3) the mol % of the ozone-decomposed component S2V1 containing two styrene-derived units and one 1,2-bonded butadiene-derived unit, and (4) the vinyl content (wt. %) of the butadiene moiety were measured. In addition, since styrene-butadiene copolymers NS570, NS460, HP755B, and E581 are oil extended products, the net compounded amounts of rubber components are indicated in parentheses together with the actual compounded amounts.

The values of (1) the bonded styrene content and (4) the vinyl content of the butadiene moiety of each styrene-butadiene copolymer component were measured by $^1$H-NMR.

The conditions for ozone decomposition of each styrene-butadiene copolymer component were as described above. In addition, (2) the mol % of the ozone-decomposed component V1 containing one 1,2-bonded butadiene-derived unit and (3) the mol % of the ozone-decomposed component S2V1 containing two styrene-derived units and one 1,2-bonded butadiene-derived unit were measured by LC×LCMS analysis under the conditions described above.

The components excluding sulfur and the vulcanization accelerator of 11 types of rubber compositions (Examples 1 to 7 and Comparative Examples 1 to 4) containing the compounding agents shown in Table 3 as common ingredients and containing a blend of the styrene-butadiene copolymer components shown in Tables 1 and 2 (blend of a plurality of styrene-butadiene copolymers) and other diene rubber components were mixed for 6 minutes using a 1.7-L sealed Banbury mixer, discharged from the mixer at 150° C., and then cooled to room temperature. Next, the mixture was mixed for 3 minutes using the 1.7-L sealed Banbury mixer again and discharged. Then, the sulfur and the vulcanization accelerators were mixed in using an open roll to prepare a rubber composition. The obtained rubber composition was vulcanized for 30 minutes at 160° C. in a predetermined mold to form a vulcanized rubber test piece. The obtained vulcanized rubber test piece was used to evaluate tan δ (60° C.), the modulus of repulsion elasticity at 60° C., and the wear resistance.

tan δ (60° C.)

The dynamic visco-elasticity of the obtained vulcanized rubber test piece was measured using a viscoelastic spectrometer available from Iwamoto Seisakusho at an elongation deformation strain of 10±2%, a vibration frequency of 20 Hz, and a temperature of 60° C., and the value of δ (60° C.) was determined. The obtained results are shown in the "tan δ (60° C.)" rows of Tables 1 and 2 as the index values, based on the index value of Comparative Example 1 of 100. Smaller index values of tan δ (60° C.) indicate lower heat build-up, which in turn indicates lower rolling resistance when used in a pneumatic tire.

Wear Resistance

Using the obtained vulcanized rubber test pieces, the amount of wear was measured in accordance with JIS K6264 using a Lambourn abrasion test machine (available from Iwamoto Seisakusho Co. Ltd.) under the conditions of: load is 15.0 kg (147.1 N), slip rate is 25%. The reciprocals of the obtained results were calculated and shown in the rows of "Wear resistance" in Tables 1 and 2 as index values, based on reciprocal of the amount of wear of Comparative Example 1 of 100. A higher wear resistance index indicates superior wear resistance.

Modulus of Repulsion Elasticity (60° C.)

Using the obtained vulcanized rubber test pieces, the impact resilience at a temperature of 60° C. was measured in accordance with JIS K6255. The obtained results are shown in the "Modulus of repulsion elasticity (60° C.)" rows of Tables 1 and 2 as index values, based on the index value of Comparative Example 1 of 100. Larger index values of the modulus of repulsion elasticity (60° C.) indicate lower rolling resistance when a pneumatic tire is produced.

TABLE 1

|  |  | Comparative Example 1 | Comparative Example 2 | Comparative Example 3 | Comparative Example 4 |
|---|---|---|---|---|---|
| NS116 | part by weight |  |  | 70 |  |
| NS570 | part by weight |  |  | 37.5 (30) |  |
| E581 | part by weight | 82.5 (60) |  |  | 96.25 (70) |
| NS460 | part by weight | 55 (40) | 137.5 (100) |  |  |
| HP755B | part by weight |  |  |  | 41.25 (30) |
| HPR850 | part by weight |  |  |  |  |
| Oil | part by weight | 0 | 0 | 30 | 0 |
| Bonded styrene content | wt. % | 31.8 | 25.1 | 26.8 | 37.2 |
| Vinyl content | % | 50.6 | 62.8 | 54.3 | 41.5 |
| V1 | mol % | 19.4 | 24.7 | 38.4 | 14.5 |
| S2V1 | mol % | 4.6 | 4.8 | 3.5 | 3.4 |
| Wear resistance | Index value | 100 | 105 | 99 | 96 |
| tan δ (60° C.) | Index value | 100 | 104 | 122 | 100 |
| Modulus of repulsion elasticity (60° C.) | Index value | 100 | 97 | 96 | 100 |

TABLE 2

|  |  | Example 1 | Example 2 | Example 3 | Example 4 | Example 5 | Example 6 | Example 7 |
|---|---|---|---|---|---|---|---|---|
| NS570 | part by weight |  |  |  |  |  |  | 25 (20) |
| E581 | part by weight |  | 41.25 (30) |  |  | 33 (24) |  |  |
| HPR850 | part by weight |  |  | 64 | 35 |  |  |  |
| 5260H | part by weight | 100 | 70 | 27 | 65 | 56 | 70 | 80 |
| 5270H | part by weight |  |  |  |  |  | 30 |  |
| BR | part by weight |  |  | 9 | 20 |  |  |  |
| Oil | part by weight | 37.5 | 26.25 | 37.5 | 30 | 28.5 | 37.5 | 32.5 |
| Bonded styrene content | wt. % | 27.9 | 30.4 | 27.3 | 27.6 | 30.4 | 25.7 | 30.5 |
| Vinyl content | % | 55.0 | 51.2 | 50.7 | 56.3 | 51.2 | 57.6 | 50.4 |
| V1 | mol % | 47.9 | 38.3 | 43.0 | 45.4 | 38.3 | 41.6 | 42.5 |
| S2V1 | mol % | 7.8 | 6.8 | 5.0 | 6.4 | 6.8 | 5.9 | 6.7 |
| Wear resistance | Index value | 108 | 104 | 107 | 107 | 104 | 108 | 105 |
| tan δ (60° C.) | Index value | 78 | 84 | 78 | 78 | 84 | 87 | 82 |
| Modulus of repulsion elasticity (60° C.) | Index value | 111 | 108 | 110 | 110 | 108 | 108 | 110 |

The types of raw materials used in Tables 1 and 2 are as described below.
- NS116: NS116 available from Zeon Corporation; bonded styrene content: 20.9 wt. %; vinyl content: 63.8%; non-oil extended product
- NS570: NS570 available from Zeon Corporation; bonded styrene content: 40.6 wt. %; vinyl content: 19.0%; oil extended product prepared by adding 37.5 parts by weight of an oil component to 100 parts by weight of SBR
- E581: E581 available from Asahi Kasei Chemicals Corporation; bonded styrene content: 35.6 wt. %; vinyl content: 41.3%; oil extended product prepared by adding 37.5 parts by weight of an oil component to 100 parts by weight of SBR
- NS460: NS460 available from the Zeon Corporation; bonded styrene content: 25.1 wt. %; vinyl content: 62.8%; oil extended product prepared by adding 37.5 parts by weight of an oil component to 100 parts by weight of SBR
- HP755B: HP755B available from JSR Corporation; bonded styrene content: 39.6 wt. %; vinyl content: 39.4%; oil extended product prepared by adding 37.5 parts by weight of an oil component to 100 parts by weight of SBR
- HPR850: HPR850 available from JSR Corporation; bonded styrene content: 27.0 wt. %; vinyl content: 58.8%; non-oil extended product
- 5260H: 5260H available from Korea Kumho Petrochemica Corporation; bonded styrene content: 27.9 wt. %; vinyl content: 55.0%; non-oil extended product
- 5270H: 5270H available from Korea Kumho Petrochemica Corporation; bonded styrene content: 20.6 wt. %; vinyl content: 63.6%; non-oil extended product Polybutadiene rubber (BR): Nipol BR1220, available from Zeon Corporation Oil: Extract No. 4S, available from Showa Shell Sekiyu K.K.

TABLE 3

| Common formulation of rubber composition | |
|---|---|
| Silica | 70.0 part by weight |
| Silane coupling agent | 5.6 part by weight |
| Carbon black | 5.0 part by weight |
| Zinc oxide | 3.0 part by weight |
| Stearic acid | 2.0 part by weight |
| Anti-aging agent | 1.5 part by weight |
| Wax | 1.0 part by weight |
| Sulfur | 1.5 part by weight |
| Vulcanization accelerator 1 | 1.7 part by weight |
| Vulcanization accelerator 2 | 2.0 part by weight |

The types of raw materials used as per Table 3 are described below.

Silica: Nipsil AQ available from Nippon Silica Co., Ltd.

Silane coupling agent: sulfide-based silane coupling agent; Si69VP available from Degussa Carbon black: Shoblack N339M, available from Showa Cabot K.K.

Zinc oxide: Zinc Oxide Grade No. 3 (JIS) available from Seido Chemical Industry Co., Ltd.

Stearic acid: stearic acid, available from NOF Corporation

Anti-aging agent: Santoflex 6PPD, available from Solutia Europe

Wax: paraffin wax, available from Ouchi Shinko Chemical Industrial Co., Ltd.

Sulfur: oil-treated sulfur, available from Karuizawa Refinery Ltd.

Vulcanization accelerator 1: Sanceller CM-PO (CZ), available from Sanshin Chemical Industry Co., Ltd.

Vulcanization accelerator 2: Sanceller D-G (DPG), available from Sanshin Chemical Industry Co., Ltd.

As is clear from Tables 1 and 2, it was confirmed that the tire rubber compositions of Examples 1 to 7 exhibited improved low heat build-up (tan δ at 60° C.), modulus of repulsion elasticity at 60° C., and wear resistance.

In the styrene-butadiene copolymer component of the rubber composition of Comparative Example 2, the content of the ozone-decomposed component V1 containing one 1,2-bonded butadiene-derived unit was less than 25 mol %, and the content of the ozone-decomposed component S2V1 containing two styrene-derived units and one 1,2-bonded butadiene-derived unit was less than 5 mol %, so the heat build-up (tan δ at 60° C.) was large, and the modulus of repulsion elasticity at 60° C. was not improved.

In the rubber composition of Comparative Example 3, the content of the ozone-decomposed component S2V1 containing two styrene-derived units and one 1,2-bonded butadiene-derived unit was less than 5 mol %, so the heat build-up (tan δ at 60° C.) was large, and the modulus of repulsion elasticity at 60° C. was not improved.

In the styrene-butadiene copolymer component of the rubber composition of Comparative Example 4, the vinyl content was less than 50%, the content of the ozone-decomposed component V1 containing one 1,2-bonded butadiene-derived unit was less than 25 mol %, and the content of the ozone-decomposed component S2V1 containing two styrene-derived units and one 1,2-bonded butadiene-derived unit was less than 5 mol %, so the wear resistance was poor.

The invention claimed is:

1. A rubber composition, comprising:
a diene rubber component containing a styrene-butadiene copolymer component including at least one styrene-butadiene copolymer;
and a reinforcing filler,
wherein the styrene-butadiene copolymer component including the at least one styrene-butadiene copolymer has characteristics (1) to (4):
(1) the bonded styrene content is from 5 to 50 wt. %;
(2) of components obtained by ozone decomposition, a content of a decomposed component V1 containing one 1,2-bonded butadiene-derived unit out of a total of 100 mol % of decomposed components containing styrene-derived unit(s) and/or the 1,2-bonded butadiene-derived unit(s) is not less than 25 mol %;
(3) of the components obtained by ozone decomposition, a content of a decomposed component S2V1 containing two of the styrene-derived units and one of the 1,2-bonded butadiene-derived unit out of a total of 100 mol % of the decomposed components containing the styrene-derived unit(s) and/or the 1,2-bonded butadiene-derived unit(s) is not less than 5 mol %; and
(4) a vinyl content of a butadiene moiety is not less than 50%;
the decomposed component V1 being a composition represented by Formula (I), and the decomposed component S2V1 being a composition represented by Formula (II):

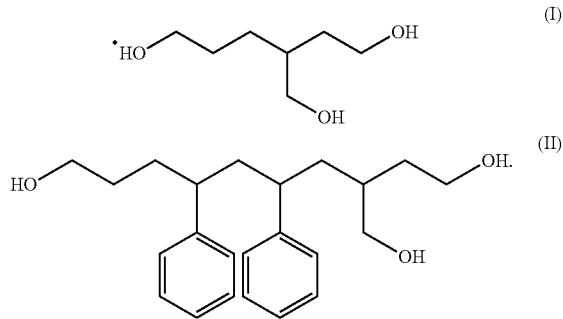

2. The rubber composition according to claim 1, wherein the diene rubber component further includes another diene rubber component other than the styrene-butadiene copolymer component.

3. The rubber composition according to claim 1, wherein the reinforcing filler is at least one selected from silica and carbon black.

4. A pneumatic tire using the rubber composition according to claim 1.

5. The pneumatic tire according to claim 4, wherein the rubber composition is used in a cap tread.

6. The rubber composition according to claim 2, wherein the reinforcing filler is at least one selected from silica and carbon black.

7. A pneumatic tire using the rubber composition according to claim 6.

8. The pneumatic tire according to claim 7, wherein the rubber composition is used in a cap tread.

* * * * *